United States Patent
Peterson

(10) Patent No.: US 7,689,616 B2
(45) Date of Patent: Mar. 30, 2010

(54) TECHNIQUES FOR SPECIFYING AND COLLECTING DATA AGGREGATIONS

(75) Inventor: Glenn R. Peterson, Kenmore, WA (US)

(73) Assignee: Microsoft Corporation, Redmond, WA (US)

(*) Notice: Subject to any disclaimer, the term of this patent is extended or adjusted under 35 U.S.C. 154(b) by 279 days.

(21) Appl. No.: 11/107,021

(22) Filed: Apr. 15, 2005

(65) Prior Publication Data

US 2006/0235879 A1 Oct. 19, 2006

(51) Int. Cl.
*G06F 17/30* (2006.01)

(52) U.S. Cl. .................................... 707/737
(58) Field of Classification Search ............ 707/1, 707/3, 6, 7, 100, 101, 104.1, 200, 10
See application file for complete search history.

(56) References Cited

U.S. PATENT DOCUMENTS

| | | | |
|---|---|---|---|
| 4,631,363 A | 12/1986 | Foster et al. | |
| 5,388,196 A | 2/1995 | Pajak et al. | |
| 5,838,319 A | 11/1998 | Guzak et al. | |
| 5,920,700 A | 7/1999 | Gordon et al. | |
| 5,953,724 A | 9/1999 | Lowry | |
| 5,978,576 A | 11/1999 | Sanadidi et al. | |
| 6,192,470 B1 | 2/2001 | Kelley et al. | |
| 6,301,701 B1 | 10/2001 | Walker et al. | |
| 6,496,842 B1 | 12/2002 | Lyness | |
| 6,904,449 B1 | 6/2005 | Quinones | |
| 7,096,178 B2 | 8/2006 | Gluhovsky | |
| 7,111,177 B1 | 9/2006 | Chauvel et al. | |
| 7,149,731 B2 * | 12/2006 | Dettinger et al. | 707/2 |
| 7,174,194 B2 | 2/2007 | Chauvel et al. | |
| 7,451,064 B2 | 11/2008 | Hodge et al. | |
| 7,577,681 B1 * | 8/2009 | Rozenman et al. | 707/101 |
| 2001/0052108 A1 | 12/2001 | Bowman-Amuah | |
| 2002/0065049 A1 | 5/2002 | Chauvel et al. | |
| 2002/0178075 A1 | 11/2002 | Emerick et al. | |
| 2003/0046396 A1 | 3/2003 | Richter et al. | |
| 2003/0058277 A1 | 3/2003 | Bowman-Amuah | |
| 2003/0163298 A1 | 8/2003 | Odom et al. | |
| 2003/0167381 A1 | 9/2003 | Herscovich et al. | |
| 2003/0176993 A1 | 9/2003 | Lines et al. | |
| 2004/0049372 A1 | 3/2004 | Keller | |
| 2004/0107219 A1 | 6/2004 | Rosenberger | |

(Continued)

OTHER PUBLICATIONS

Marc, "Free Windows Explorer replacement with tabbed UI", Apr. 7, 2004, 2 pages.
PCT Search Report for Patent Application No. 0609245, mailed on Oct. 30, 2007, 7 pages.

(Continued)

*Primary Examiner*—Vincent Boccio
*Assistant Examiner*—Marc R Filipczyk
(74) *Attorney, Agent, or Firm*—Lee & Hayes, PLLC

(57) ABSTRACT

Data records containing one or more fields, which can be considered keys and/or values, are received, and processed such that data values of records that contain key values of interest are aggregated together. The keys of the resultant aggregations or "resultant keys" are created under the control of simple parameters to an aggregation framework. Similarly, the particular aggregations performed are also under the control of a similar set of simple parameters to the aggregation framework. Mapping of keys to reduce originality is one of the important features of resultant key creation. Finally, the structure of the parameters used to control aggregation is simple, flexible, and powerful.

15 Claims, 10 Drawing Sheets

U.S. PATENT DOCUMENTS

| | | |
|---|---|---|
| 2004/0181794 A1 | 9/2004 | Coleman et al. |
| 2005/0027661 A1 | 2/2005 | Lober et al. |
| 2005/0102121 A1 | 5/2005 | Odhner et al. |
| 2005/0125401 A1* | 6/2005 | Carr et al. .................. 707/5 |
| 2005/0195165 A1 | 9/2005 | Mitchell |
| 2006/0004923 A1 | 1/2006 | Cohen et al. |
| 2006/0047813 A1 | 3/2006 | Aggarwal et al. |
| 2006/0075286 A1 | 4/2006 | Hodge et al. |
| 2006/0112130 A1 | 5/2006 | Lowson |
| 2006/0161417 A1 | 7/2006 | Hardwick et al. |
| 2006/0167704 A1 | 7/2006 | Nicholls et al. |
| 2007/0288526 A1* | 12/2007 | Mankad et al. ............ 707/200 |
| 2009/0240691 A1* | 9/2009 | Yano et al. .................. 707/5 |

OTHER PUBLICATIONS

PCT Search Report for Patent Application No. 0609161, mailed on Oct. 16, 2007, 7 pages.

PCT Search Report for Patent Application No. 0609282, mailed on Dec. 4, 2007, 7 pages.

J.P. Buzen, "Fundamental Operational Laws of Computer System Performance", 1976, Acta Informatica, vol. 7, pp. 167-182.

Daniel A Menasce et al., "Performance by Design: Computer Capacity Planning by Example", 2004, Prentice Hall, 24 unnumbered pages.

Lu, et al., "Operating-System Directed Power Reduction", Internal Symposium on Low Power Electronics and Design, 2000, pp. 37-42.

* cited by examiner

TECHNIQUES FOR SPECIFYING AND COLLECTING DATA AGGREGATIONS

TECHNICAL FIELD

This invention relates to implementing one or more collections of data aggregations, and particularly applying flexible parameters in specifying, creating, and populating those collections of data aggregations.

BACKGROUND

A number of applications may compile and gather information or data. An example of such an application is modeling or simulation performed by a computer software system (simulated system). The simulated system may run on thousands of computers and use tens of thousands of devices. Furthermore, the system may handle tens to hundreds of pieces of data while performing tasks. The tasks may be performed by hundreds of components on behalf of different users located in various locations.

Therefore, such a simulation can produce a great number of data in a single simulation. Typically, it may be desirable to develop a conclusion or conclusions from processed data. For example, a conclusion from the processed data may show an elapsed averaged time for the simulated system to process the data, providing an insight to how efficient the simulated system is performing.

Data aggregations are summaries of larger collections of data. Data aggregations are desirable because they are typically smaller in size than the original data and allow patterns to be observed that may be difficult to observe from the larger volume of data which include greater detail.

Although smaller and more manageable than original data, data aggregations can still be extremely large and cumbersome if enough data is retained after data aggregation. This is particularly the case when data views or queries are performed using data aggregation. Examples of queries or views include request to aggregate data based on a one or more particular common features. To be effective or provide practical use, data aggregation should allow such queries. However, queries tend to make data aggregations larger by including a greater number of data that what may be needed to find a conclusion or pattern. Practical consideration should be made as to computing resource constraints in limiting the size of data aggregations. Furthermore, the nature of queries of the data aggregations frequently change over time, either due to new external requirements or due to conclusions based on previous aggregations of the same or similar data.

A first solution in addressing problems related to managing data aggregation includes limiting the number of categories of data aggregation, for example determining only how long each task took and how busy each device was. A second solution may be to transfer data aggregations to much larger storage. The disadvantage of the first solution is that there is a tendency that data aggregations do not provide rich enough conclusions to answer particular queries or provide sufficient pattern recognition. Although the second solution provides rich data, it tends to be relatively very slow. Therefore, it is desirable to efficiently control and provide data aggregation in a flexible method that supports a large or potential large volume of data.

SUMMARY

Input data records consist of a set of fields, each of which has a value, which may potentially be empty. Aggregation parameter sets specify the use of the input data record fields as key components and/or aggregation inputs. In particular, aggregation parameter sets may be applied to the individual data records to identify the input data fields as key values and how to use them to create keys for a given collection. Further, aggregation parameter sets may be applied to the individual data records to identify the input data fields as input to one or more aggregations. Finally, each aggregation parameter set controls the creation and population of a single aggregation collection out of many.

BRIEF DESCRIPTION OF THE CONTENTS

The detailed description is described with reference to the accompanying figures. In the figures, the left-most digit(s) of a reference number identifies the figure in which the reference number first appears. The use of the same reference number in different figures indicates similar or identical items.

DETAILED DESCRIPTION

The following disclosure describes techniques in which data are collected, processed, and aggregated.

Figure 1:
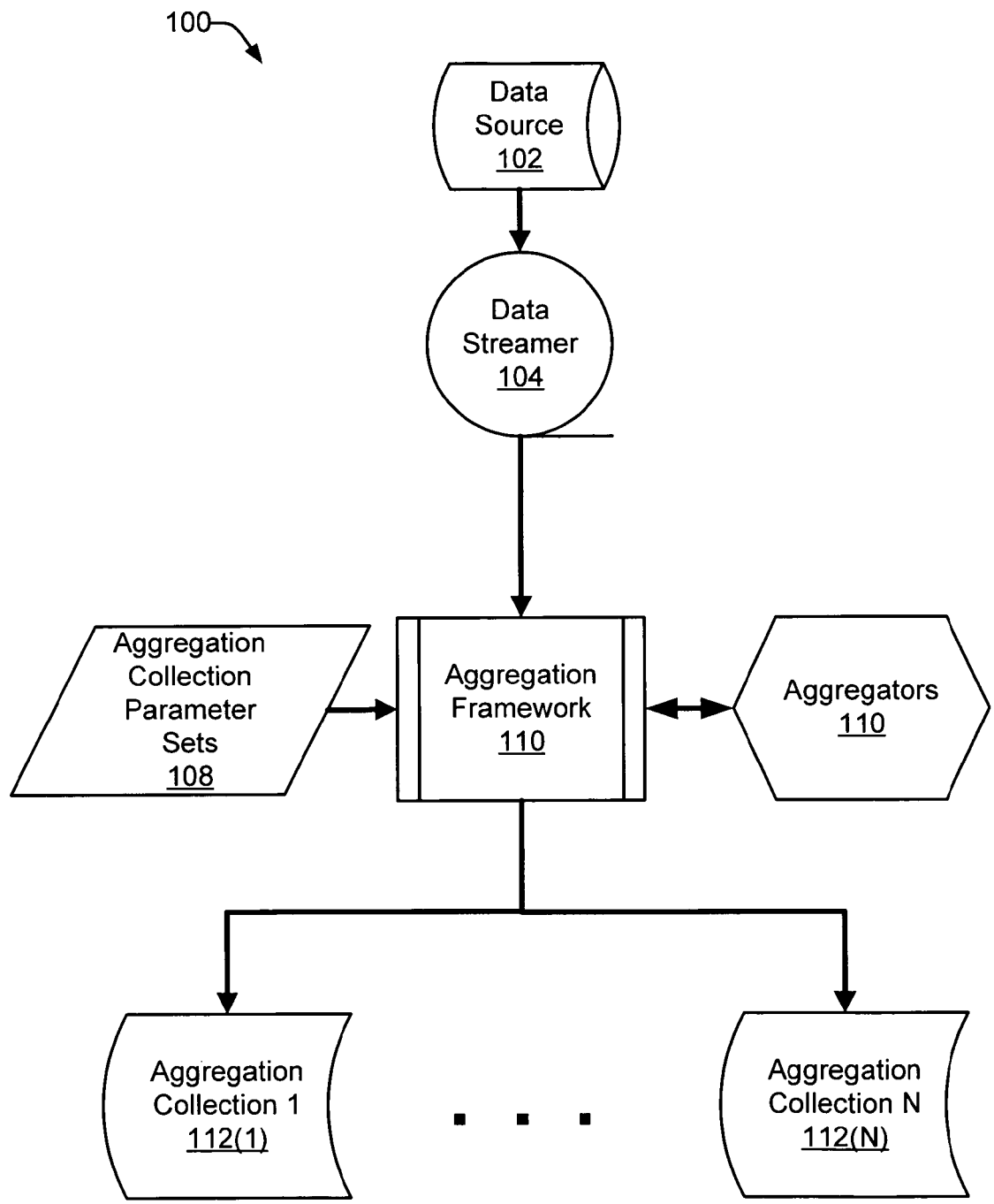
FIG. 1 is a block diagram illustrating a computer that receives data and creates data aggregation collections.

FIG. 1 shows a computer 100 that processes data and creates aggregation collections. The computer 100 may be part of a larger system of computers and other various hardware devices such storage devices. In this example, the computer 100 includes a data source 102.

Data source 102 includes storage devices such as redundant arrays of independent disks (RAID), and computers or computing devices generating data. In particular, data source 102 includes data records. As will be further discussed in detail below, each data record contains fields which may be used as keys and/or individual pieces of data. Data source 102 may store such data records for later use or delivery (i.e., send the data records). Data source 102 may continuously create and delivery the data records to other hardware devices. In certain cases, data source 102 may be part of another device external to computer 100.

The data records from data source 102 may be sent as a batch, as individual data records, a combination, or in some other manner to a data streamer 104. Data streamer 104 sends individual data records. A more detailed implementation of computer 100 is further described below.

Computer 100 includes a predefined process component shown as aggregation framework 106. The aggregation framework 106 receives the individual data records and processes the data records into aggregation collections. In particular, aggregation framework 106 receives one or more aggregation parameter sets 108 that define how received data records are combined and presented as aggregation collections. Aggregation parameter sets 108 are defined by a user as to what aggregation data information is to be collected and processed. Aggregations parameter sets 108 may be implemented as data collection controls described below. Each aggregation parameter set includes "key control" and "aggregation control" components.

Aggregators 110 are provided to aggregation framework 106, and act on data records. Aggregators may be stored in memory of computer 100. In particular, aggregators 110 are functions or actions that are applied to data in data records. Examples of such functions or actions include counting, "averaging" or taking the average value of data values, summing data values, finding a minimum or maximum of data values, and computing the variance of the data value.

Based on the aggregation parameter sets 108, which may be defined or changed according to the goals or a user, one or more "aggregation collection 1" 112(1) to "aggregation collection N" 112(N) are created. The aggregation collections 112 may be stored for later analysis or presented to and viewed by a user. In certain cases, aggregation collections 112 may be stored in a memory of computer 100. Furthermore, each record in an aggregation collection 112 is identified by a unique resultant key derived from fields in the data record. Key processing is described in greater detail below.

Figure 2:
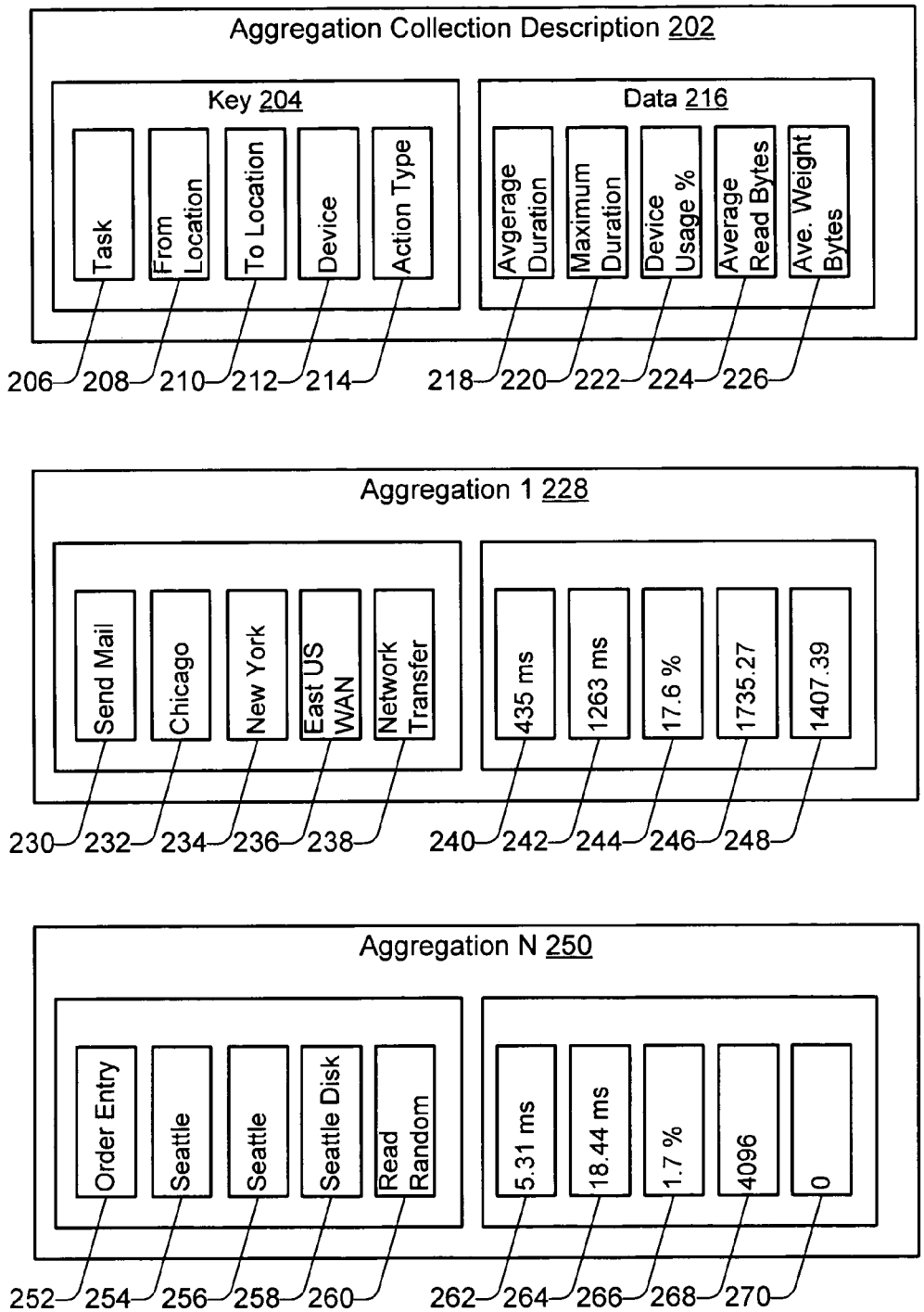
FIG. 2 is a block diagram illustrating an aggregation collection that is created from processed data.

FIG. 2 shows an aggregation collection. Aggregation collections 112 of FIG. 1 may include one or more aggregations shown by aggregation collection 200. An aggregation collection description 202 includes keys 204 which include key categories in which data records or data aggregations may be identified. In this example, keys 204 includes the following key categories: "task" 206, "from location" 208, "to location" 210, "device" 212, and "action type" 214. Aggregation collection description 202 includes categories of actual data values or data 216. In this example, data 216 includes the following data categories: "average duration" 218, "maximum duration" 220, "device usage percentage 222", "average read bytes" 224, and "average weight bytes" 226. The data categories of data 216 may be based on actions or functions or aggregators, such as aggregators 112 of FIG. 1.

One or more aggregations may be created, each aggregation presenting information derived from a number of data records. Such information is directed to key categories in keys 204, and aggregators as defined in data 216. In this example, "aggregation 1" 228 describes a key value "send mail" 230 under the key category "task" 206, key value "Chicago" 232 under the key category "from location" 208, key value "New York" 234 under the key category "to location" 210, key value "east US WAN" 234 under the key category "device" 212, and key value "network transfer" 238 under the key category "action type" 214.

Data records that match or include key values, as included in key values 230 to 238, are aggregated and an action based on aggregation control portion of aggregation control parameter set defined in data 216 is performed. Values of that result from thee actions are presented in "aggregation 1" 228 as "435 ms" in data value 240, "1263 ms" in data value 242, "17.6%" in data value 244, "1735.27" in data value 246, and "1407.39" in data value 248. For example, the average duration, as identified by data category 218, of all data record meeting the keys of "aggregation 1" is "435 ms" in data value 240.

In this example, aggregation N 250 is shown as included in aggregation collection 200. "Aggregation 1" 250 describes a key value "order entry" 252 under the key category "task" 206, key value "Seattle" 254 under the key category "from location" 208, key value "Seattle" 256 under the key category "to location" 210, key value "Seattle Disk" 258 under the key category "device" 212, and key value "read random" 260 under the key category "action type" 214. Data values in "aggregation 1" 250 include "5.31 ms" in data value 262, "18.44 ms" in data value 264, "1.7%" in data value 266, "4096" in data value 268, and "0" in data value 248.

Figure 3:
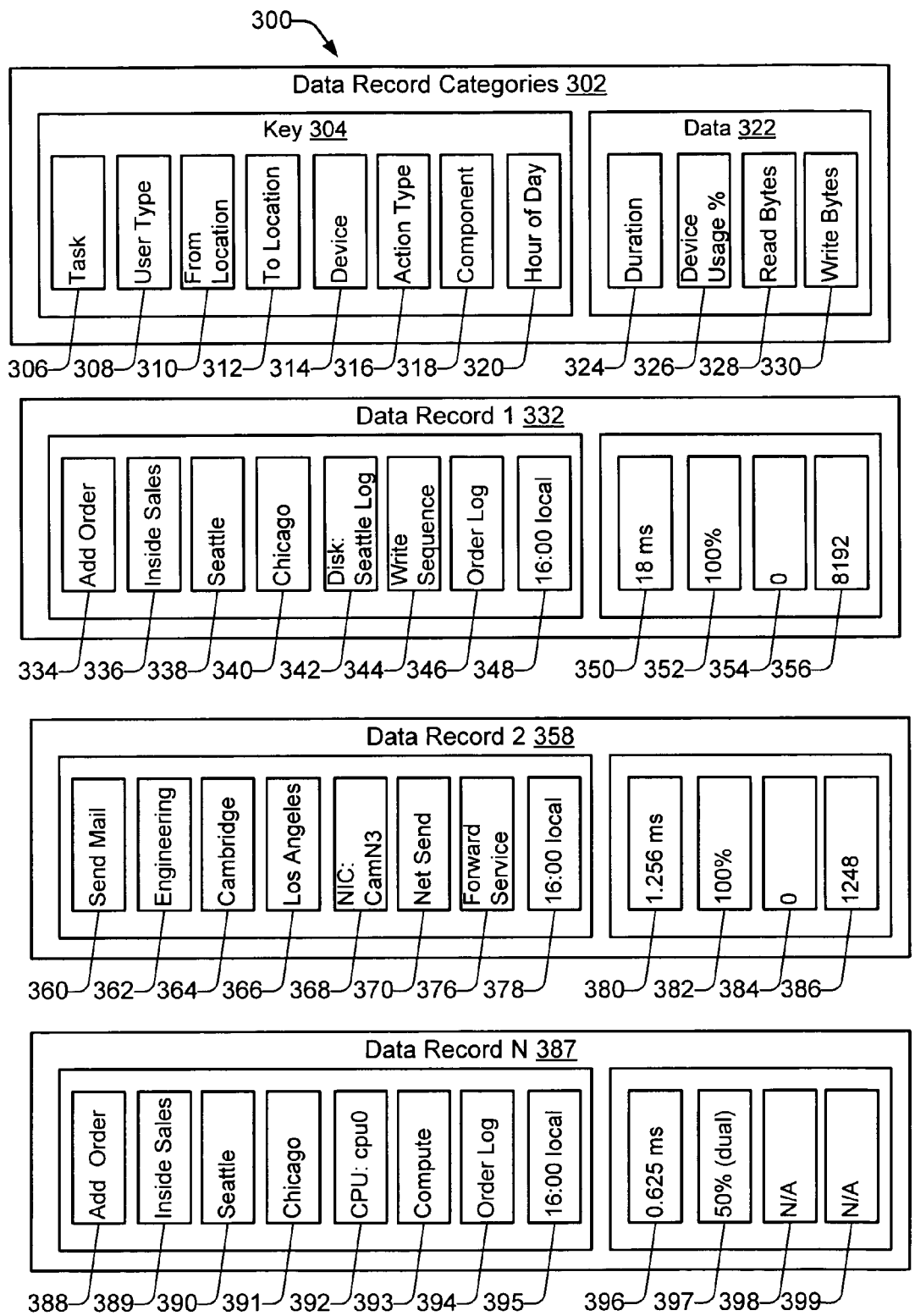
FIG. 3 is a block diagram of data record fields, and example data records.

FIG. 3 shows examples of data records 300. Such data records 300 may be received and processed by computer 100 of FIG. 1. Data records 300 are described by data record categories 302. Data record categories 302 has a key field or key 304 that defines key categories and data category or data 322. Note that this differentiation of key and data is contextual, and determined by a particular aggregation parameter set. In other words, in certain cases, keys and data categories may be the same or treated the same by the particular aggregation set. In general, data records 300 include a set of fields, each field may have a actual value or potentially an empty or null value. In particular, the use of each field is controlled by an aggregation collection parameter set. In a given aggregation collection, an input field may be a key field, a data field (to be aggregated), neither, or both.

In this example, key 304 includes key categories that each data record contains. In this example, key 304 includes the following categories: "task" 306, "user type" 308, "from location 312, "action type" 316, "component" 318, and "hour of day" 320. Data 322 includes data categories for the data records, and particularly the following data categories: "duration" 324, "device usage %" 326, "read bytes" 328, and "write bytes" 330.

Included in data records 300 are one or more data records. "Data record 1" 332 contains particular key values and data values. Key value 334 corresponds to key category 306, and has the key value "add order" defining an add order task. The other key values 336 to 348 further correspond to key categories in key 304, and define a particular task or provide a particular value. Data value 350 corresponds to data category 324, and has a data value of "18 ms". The other data values 352 to 356 correspond to data categories in data 322, and provide specific values.

"Data record 2" 358 contains particular key values and data values. Key value 360 corresponds to key category 306, and has the key value "send mail" defining a send mail task. The other key values 362 to 378 further correspond to key categories in key 304, and define a particular task or provide a particular value. Data value 380 corresponds to data category 324, and has a data value of "1.256 ms". The other data values 382 to 386 correspond to data categories in data 322, and provide specific values.

"Data record N" 387 contains particular key values and data values. Key value 388 corresponds to key category 306, and has the key value "add order" defining an add order task. The other key values 389 to 394 further correspond to key categories in key 304, and define a particular task or provide a particular value. Data value 396 corresponds to data category 324, and has a data value of "0.625 ms". The other data values 397 to 399 correspond to data categories in data 322, and provide specific values.

Figure 4:
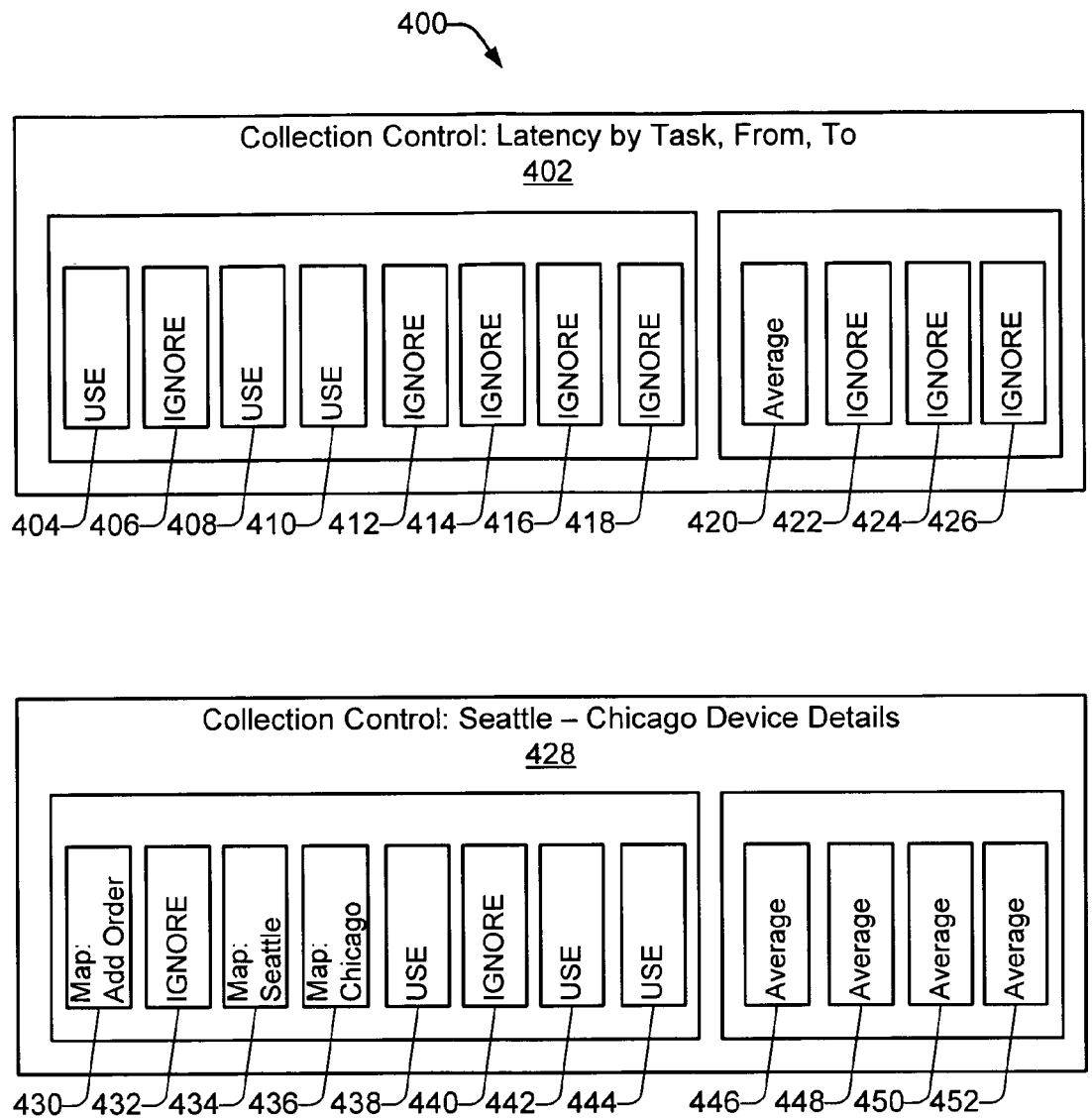
FIG. 4 is a block diagram of data collection controls applied to data records.

FIG. 4 shows data collection controls 400. Data collection controls 400 are applied to multiple data records that are received, and are used to control the creation of aggregations and aggregation collections. The data collection controls 400 may be used as the aggregation parameter sets as described above in FIG. 1. In general, data collection controls 400 provide key control and aggregation control. Key control is defined as specifying which input fields are used as key components and how they are used. Aggregation control is defined as specifying, for each input field, which aggregations are performed. Key control may indicate an "ignore" where the field is not part of the resultant key for the aggregation collection. Key control may indicate a "use" in three cases. The first case of "use" of key control may be directed to "unmapped" where key values for the key are unmodified. A second case of "use" of key control may be "mapped" where a look up is performed for each key value in a dictionary or other mechanism and use the resultant value as the key value for this key in the aggregation collection. In certain cases, key values may be mapped to a special value (e.g., "null") which is taken to mean: discard this data record. A third case of "use" of key control may be to "composite" or "composite key" where a new key is created by combining other keys with the same composite specification.

As shown in the FIG. 4, key control and aggregation control blocks (e.g., 404-418 and 420-426 respectively) are distinct. However, in other cases, input data record fields can be used as key fields, aggregation sources, neither, or both. Therefore, a more general representation of 400 would have the key control block (404-418 for instance) extend to the right side of 400 with "IGNORE" specified for the four rightmost input record data fields. Similarly, the aggregation control would extend to the left side of 400 with "IGNORE" specified for the eight left-most input record data fields.

As noted elsewhere, aggregation control can be segregated by aggregation type (count, sum, min, max, etc.), such that a more general representation of 400 would have one row of key control parameters and "M" rows of aggregation control parameters where "M" is the number of potential aggregations. Most aggregations have no parameterization other than to either perform or omit them, therefore a Boolean (true/false value) can represent the entirety of the aggregation control for such aggregations. An exception to this is the case of histograms (i.e., population vs. value tables) which can benefit from parameterization.

Exemplary data collection control 402 is directed to aggregating or collecting data from data records related to tasks, and identifying particularly transactions as based on the key category 310 that defines "from", and key category 312 that defines "to". Control is provided by particularly identifying relevant key values and ignoring key values of no interest.

If only the ignore and use (unmapped) key control options are used, a simple Boolean array may be used for the key control portion of the aggregation parameter set. In some cases (e.g., input data records with 64 or fewer fields) this can be implemented as a bit array using a single integer of the appropriate length to completely control the formation of the resultant collection keys.

The specifying of aggregation control can be implemented as a two-dimensional array of Booleans. The array can be indexed by field index and aggregation type. In some cases in a manner similar to key control, aggregation control can be implemented as an array of integers of the appropriate length. Each aggregation (e.g., count, sum, min, max, histogram, etc.) is assigned an index in the array of integers and each data field is assigned a bit number within each integer. Assuming the definitions in this paragraph, the integer array {0, 4, 4, 4, 64} would specify computing the sum, min, and max of field two (counting from zero) since 4 is 2 to the second power and a histogram of field 6 since 64 is 2 to the 6th power.

The use of bit arrays for both key control and aggregation control affords advantages in implementations. One advantage is that determining aggregation control subsets can be done by a series of simple Boolean operations. It is noted that one key control and N aggregation control integers can be used and that a given bit number refers to the same input data record field in all cases.

Data collection control 402 identifies that the key value 404 is to be "used", key value 406 is ignored, key value 408 is "used", key value 410 is "used", key value 412 is ignored, key value 414 is ignored, key value 416 is ignored, and key value 418 is ignored. Key value 404 corresponds to key category "task" 306, key value 406 corresponds to key category "user type" 308, key value 408 corresponds to key category "from location" 310, key value 410 corresponds to key category "to location" 312, key value 412 corresponds to key category "device" 314, key value 414 corresponds to key category "action type" 316, key value 416 corresponds to key category "component" 318, and key value 418 corresponds to key category "hour of day" 320.

Data collection control 402 further defines actions performed on identified data records. Data value 420 corresponds to data category 324 directed to "duration". Data value 420 directs an action to perform an "averaging" of data values applicable to "duration". While only a single action is specified in this example, it should be noted that multiple actions may be specified as, for example, average, minimum, and maximum. No action is performed as to the other data values 422, 424, and 426. In other words, no action is performed on data values of data records related to "device usage" (data category 326), "read bytes" (data category 328), and "write bytes" (data category 330).

Data collection control 428 is directed to aggregating or collecting data from data records related to actions involving add order transactions between Seattle and Chicago. Control is provided by identifying relevant key values and ignoring key values of no interest. Particular key values are identified to very significantly limit data records that are collected and aggregated. In particular, the key values related to identifying the task of "adding orders", originating from "Seattle" and ending at "Chicago".

Data collection control 428 identifies that key value 430 identifies only data records whose task is to "add orders" (Add Order). Key value 432 is ignored. Key value 434 identifies only data records that are "from Seattle". Key value 436 identifies only data records that are "to Chicago". Key value 438 is used. Key value 440 is ignored. Key value 442 is used. Key value 444 is used.

Data collection control 428 further defines actions performed on identified data records. Data value 446 corresponds to data category 324 directed to "duration". Data value 446 directs an action to perform an "averaging" on data values applicable to "duration". Data value 448 corresponds to data category 326 directed to "device usage percentage". Data value 448 directs an action to perform an "averaging" of data values applicable to "device usage percentage". Data value 450 corresponds to data category 328 directed to "read bytes". Data value 450 directs an action to perform an "averaging" all data values applicable to "read bytes". Data value 452 corresponds to data category 430 directed to "write bytes". Data value 452 directs an action to perform an "averaging" on all data values applicable to "device usage percentage".

Figure 5:
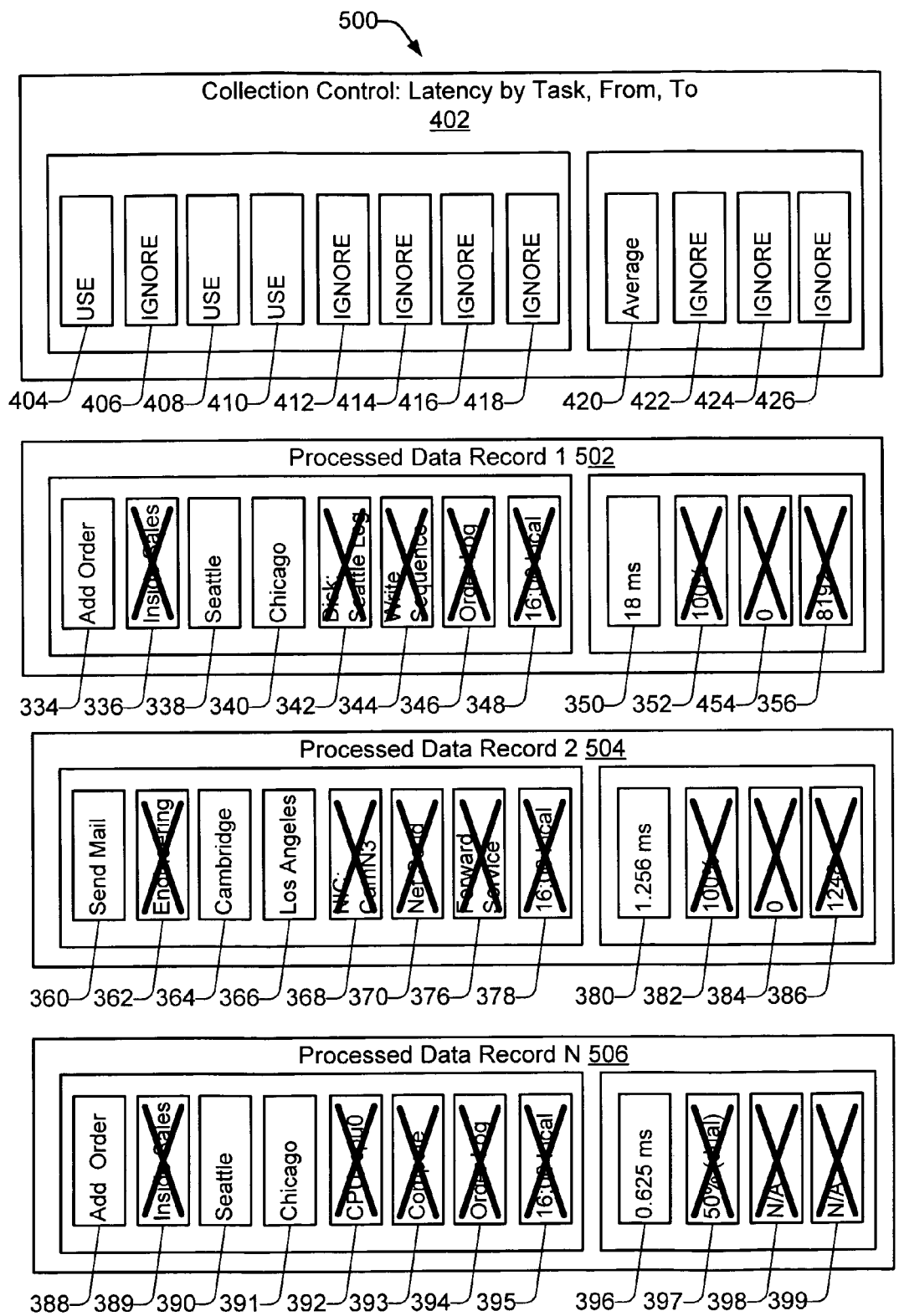
FIG. 5 is a block diagram of an example of processed data records based on a collection control.

FIG. 5 shows processed data records. In this example, data records 332, 358, and 387 of FIG. 3 are processed by data collection control 402. The processed data records may be later processed as an aggregation and be part of an aggregation collection such as aggregation collections 112 of FIG. 1. Since the processed data records are smaller in size than the original data records, less computing resources are needed to further process or aggregate the processed data records. In addition, the aggregation collections hold fewer records. As the input records can be discarded, the aggregations typically take less computing resources than the original data and can usually be stored in main memory of a local computer (e.g., computer 100 of FIG. 1).

Processed data record 1 502 is a reduced set of data record 1 332 based on key values and data values of data collection control 402. Processed data record 1 502 includes only key values 334, 338, and 340, and data value 350 from data record 1 332.

Processed data record 2 504 is a reduced set of data record 2 358 based on key values and data values of data collection control 402. Processed data record 2 504 includes only key values 360, 364, and 368, and data value 380 from data record 2 358.

Processed data record N 506 is a reduced set of data record N 387 based on key values and data values of data collection control 402. Processed data record N 506 includes only key values 388, 390, and 391, and data value 396 from data record N 387.

Figure 6:
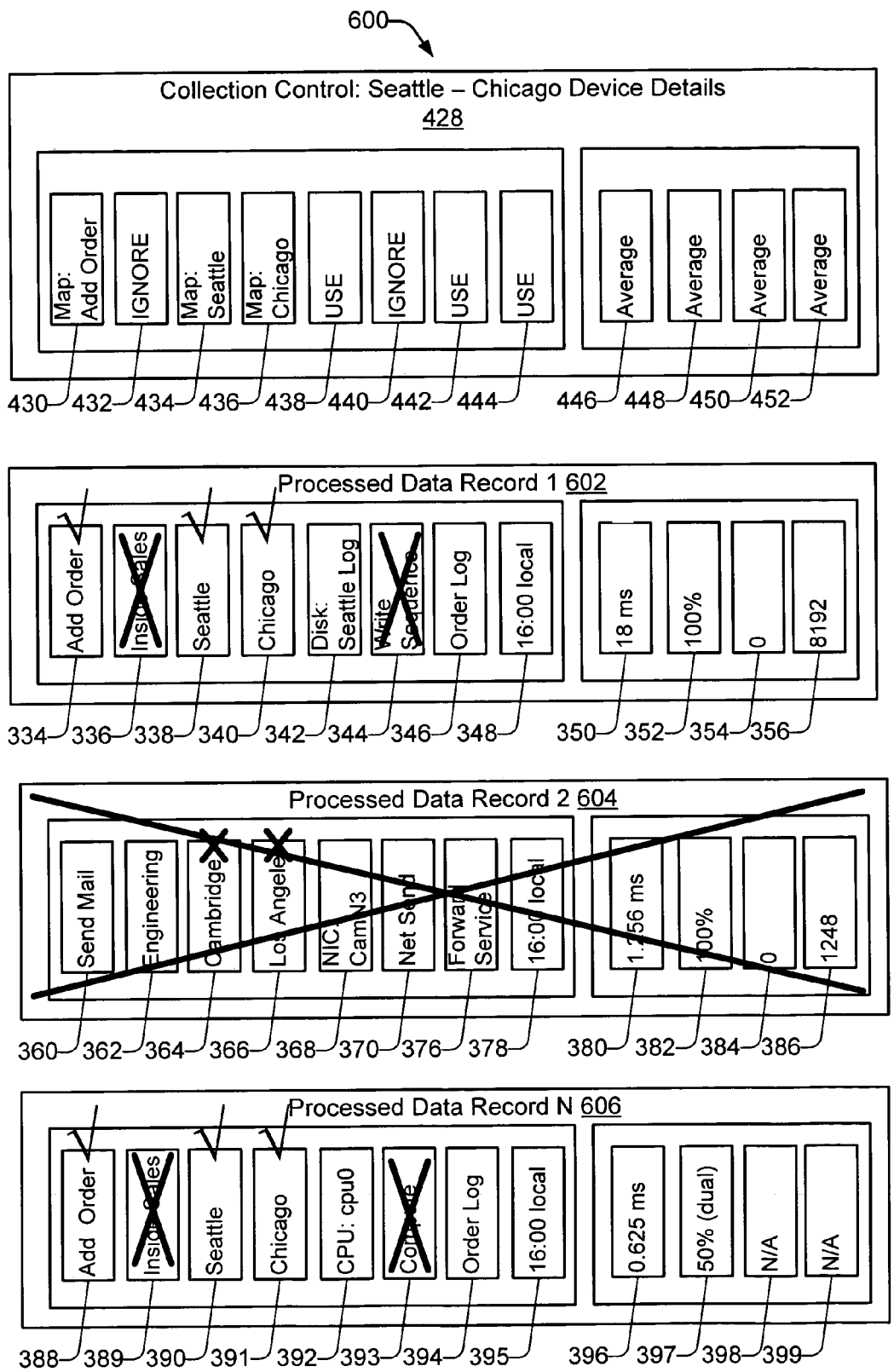
FIG. 6 is a block diagram of another example of processed data records based on a collection control.

FIG. 6 shows another example of processed data records. In this example, data records 332, 358, and 387 of FIG. 3 are processed by data collection control 428. Like the examples of FIG. 5, the processed data records may be later processed as an aggregation and be part of an aggregation collection such as aggregation collections 112 of FIG. 1.

Data collection control 428 through the use of key values 430, 434, and 436 selectively processes data records that have values meeting the key values of 430, 434, and 436. Processed data record 1 602 is derived from data record 1 332, processed data record 2 604 is derived from data record 2 358, and processed data record N is derived from data record N 387.

Processed data record 1 602 includes the values defined by key values of 430, 434, and 436. In specific, key values 430, 434, and 436 define for or select data records that have tasks directed to "adding orders", for transactions "from Seattle", and going "to Chicago". Therefore data record 1 332 meets or includes such values, and is further processed as processed data record 1 602. Likewise, data record N 387 meets or includes such values, and is processed as processed data record N 606.

Data record 2 358 includes one or more values that do not meet key values 430, 434, and 436. Therefore, through key values of 430, 434, and 436 of data collection control 428, processed data record 2 604 is identified as an invalid or non-relevant data record.

Figure 7:
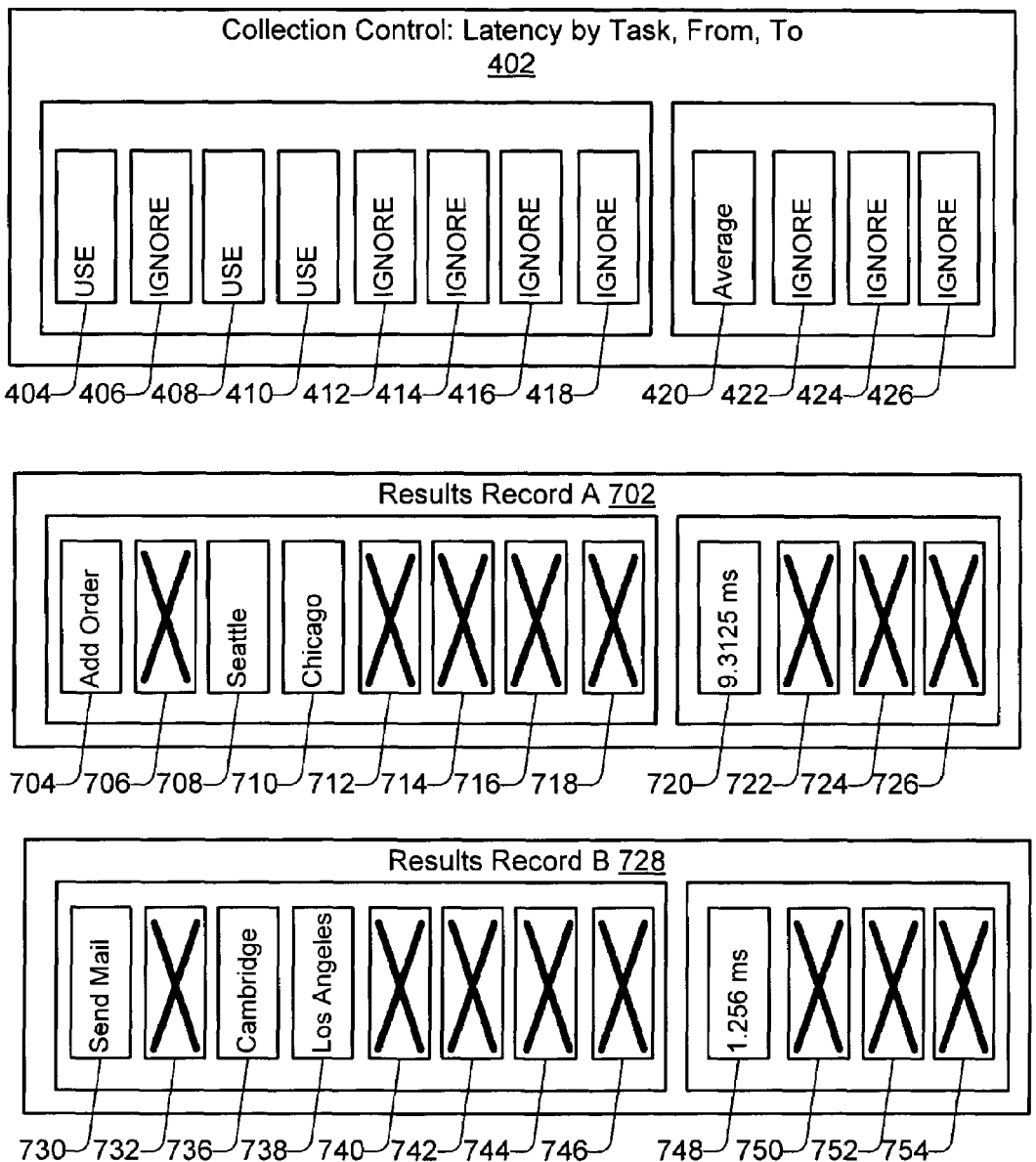
FIG. 7 is a block diagram of an example of results records based on a collection control.

FIG. 7 shows results records that may be included in an aggregation collection. This example is based on data collection control 402, and performs actions based on data categories of data collection control 402. The actions are performed on processed data records 502, 504, and 504 of FIG. 5.

In particular, processed data records 502 and 506 are combined together, since they have the same identified key values, namely "add order" as defined in key value 404, "Seattle" as defined in key value 408, and "Chicago" as defined in key value 410. Data value 420 instructs an averaging action to be performed on values of all data records (i.e., processed data records 502 and 506) that are identified by the particular values.

Results data record A 702 includes key values 704-718; however, only key values 704, 708, and 712 have values and are relevant. In addition, results data record A 702 includes data values 720-726, where only data value 720 provides an actual value of "9.3125 ms" which is the average of data value 350 of processed data record 1 502 and data value 396 of processed data record N 506.

Processed data record 2 504 has key values that are unique from other data records (i.e., processed data records 504 and 506) in the particular collection being described. Therefore, processed data record 2 504 is the only data record used in processing results record B 728.

Results record B 728 includes key values 730-746; however, only key values 730, 736, and 738 are relevant. In addition, results record B 728 includes data values 748-754, where only data value 748 provides an actual value of "1.256 ms" which is data value 396 of processed data record N 506.

Figure 8:
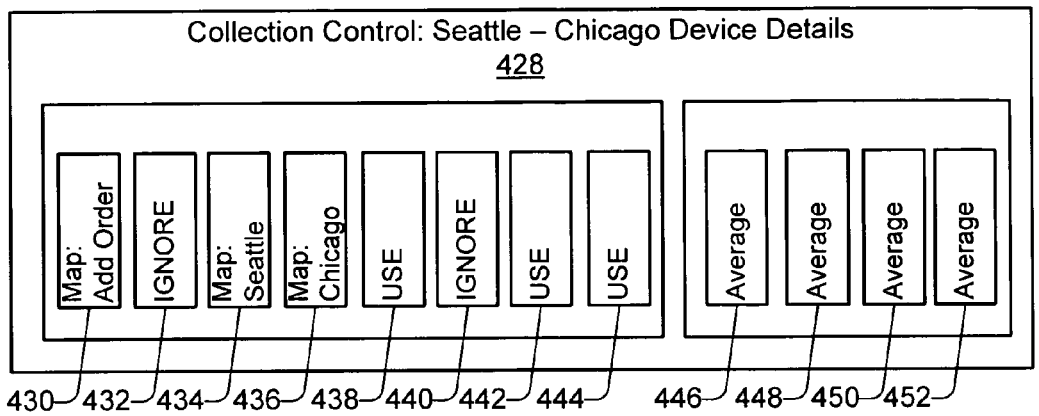
FIG. 8 is a block diagram of another example of results records based on a collection control.
Figure 8:
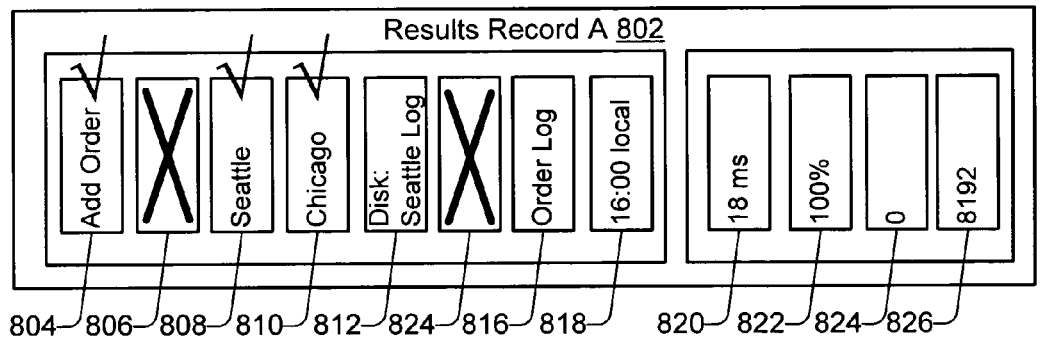
Figure 8:
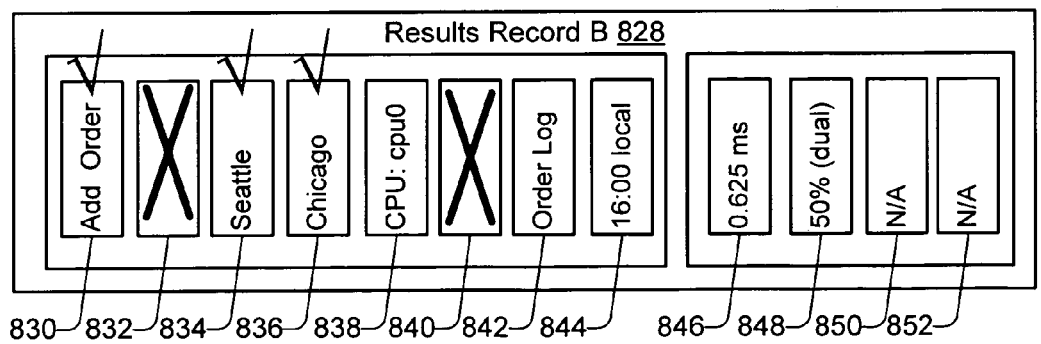

FIG. 8 shows another example of results records that may be included in an aggregation collection. This particular example is based on data collection control 828, and performs actions based on data categories of data collection control 428. The actions are performed on processed data records 602 and 606 of FIG. 6.

Since processed data records 602 and 606 have key values that are unique from other processed data records, data records 602 and 606 are processed respectively as results record A 802 and results record B 812. Results record A 802 includes key values 804-818; however, only key values 804, 808, 810, 812, 816 and 818 have values and are relevant. Results record A 802 also includes data values 820-826 which have actual values and are considered relevant. Results record B 812 includes key values 830-846; however, only key values 830, 834, 836, 838, 842 and 818 have values and are relevant. Results record B 828 also includes data values 846-852 which have actual values and are considered relevant.

Furthermore, data records, such as results records 702, 728, 802, and 812 can be further processed with data collection controls. In other words, data records may be further processed or defined by applying succeeding data collections controls on the records.

Figure 9:
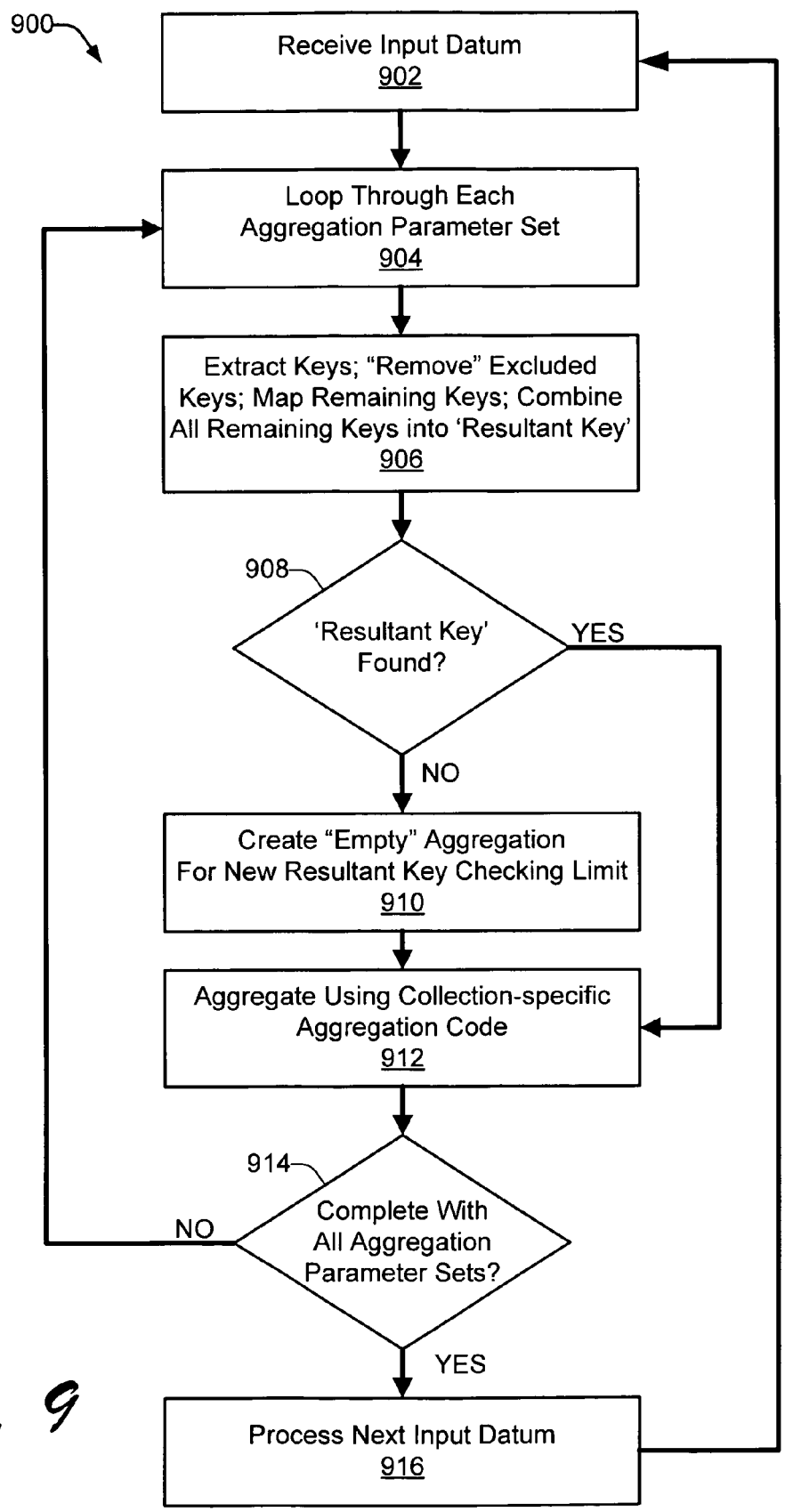
FIG. 9 is a flow diagram illustrating a process of processing data using fields in data records as keys.

FIG. 9 shows a process 900 to process data using keys in data records. The process 900 is illustrated as a collection of blocks in a logical flow graph, which represent a sequence of operations that can be implemented in hardware, software, firmware, or a combination thereof. In particular, process 900 may be implemented in a computer such as computer 100 of FIG. 1. In the context of software, the blocks represent computer instructions that, when executed by one or more processors, perform the recited operations. Although described as a flowchart, it is contemplated that certain processes may take place concurrently or in a different order.

At block 902, an input datum or an individual data record is received. Such a data record may include data records from a data source such as data source 102 and streamed by data streamer 104. Each particular data record includes one or more fields, such as key values 230-238 and 252-258 described in FIG. 2.

In certain embodiments, a pre-processing step and a post-processing step may be performed on aggregation parameter sets. The steps are directed to reduce the number of simultaneous aggregations when one aggregation can be derived from another, and to achieve a final reduction in a simpler manner. In specific, the pre-processing step searches the aggregation parameter sets for subsets and marks the subsets (i.e., marked subsets) for deferred processing. The subsets are deferred in the steps that follow, and during the post-processing step, subsets are computed from supersets (i.e., marked subsets).

For example, two aggregation parameter sets, APS1 and APS2, are defined by the following syntax. APS1: Key (Task, Device), Aggregations (Sum (Latency)) and APS2: Key (Task), Aggregations (Sum (Latency)).

APS1 is computed during normal processing and APS2 is computed from APS1 when all the data is processed.

The following example pseudocode describes how APS2 can be derived from APS1:

*Foreach* (task in APS1.tasks)
{
    APS2[task].Sum = 0;
    *Foreach* (device in APS1.devices)
    {
        APS2[task].Sum += APS1[task, device].Sum;
    }
}

The pre-processing step analyzes APS1 and APS2, and determines that APS2 can be computed in post-processing. The post-processing step performs the syntax as described above and creates APS2.

At block 904, for each aggregation parameter set, a received data record is processed. Several aggregation parameter sets may be provided. As discussed above in FIG. 1, each aggregation parameter set specifies how data records are processed. In particular, aggregation parameter sets provide control as to identifying input data (i.e., data records) that contain particular key values and actions to perform on actual data that is included in the input data. Each of the aggregation parameter sets defines fields to be treated as keys and fields to be aggregated for a given aggregation collection. In this manner, the aggregation parameter set is used to identify both the categories of interest (keys) and the relevant aggregations that are of interest to the user. The aggregation parameter sets control the specific aggregations to be performed on each of the input data record fields, including the option to perform no aggregations on a given input data record field. When key mapping is used, the aggregation parameter set allows specifying input data field values, which cause an input data record to be ignored or left out of all aggregation in a given collection.

At block 906, based on each aggregation parameter set, keys or key value that are identified as to be "ignored" or excluded are removed from each data record (data record). In particular, a subset of the one or more fields is selected as keys according to a supplied parameter or aggregation parameter set. Key selection is performed (i.e., selecting a subset from the one or more fields), where keys that are identified as "relevant" may be mapped and/or used as part of a composite key.

A key field is defined as a field from an input data record that is used as a key in a specific aggregation collection. Key mapping is defined as transforming a key from one domain to another, usually with a reduction in ordinality. For example: mapping five digit zip codes to a State abbreviation. 98xxx->WA. A composite key is defined as a key created from more than one other key. For example, "From-To" composite key: "Sea-Chi" is a composite key for a record with a "From" of "Sea" and a "To" of Chi. Furthermore, composite keys are usually mapped. A resultant key is defined as a logical concatenation of all non-ignored keys. This includes the result of unmapped, mapped, and composite keys. For example, the resultant key for Record A 802 is: Add Order|Seattle|Chicago|Disk Seattle Log|Order Log|16:00.

The resultant key identifies a unique record in an aggregation collection to which the individual input data (data records) contribute data. Particular implementations include lookup tables and maps. Furthermore, an aggregation parameter set defines actions performed on data included in each data record.

If prior input data records have been received, a resultant key may have been created that is unique to an aggregation collection. If the particular data record's resultant key is found to have no correspondingly keyed record in the aggregation collection (i.e., following the NO branch of block 908), then a new, empty record is created in the aggregation collection as shown in Block 910, subject to a record control limit. Block 912 is then performed, where aggregations are performed.

In block 912, aggregation is computed based on the specific aggregation parameter set identified at the particular instance or iteration. In particular, computing is performed for data aggregation according to the supplied parameters. This aggregation is performed as specified in the aggregation parameter set on the aggregation record either found in block 908 or created in block 910.

If additional aggregation parameter sets are to be applied to the received data record (i.e., following the NO branch of block 914), block 904 is performed using the next succeeding aggregation parameter set. If all of the aggregation parameter sets have been applied to the particular data record (i.e., following the YES branch of block 914), then at block 916, the next input datum or data record in a queue of data records is processed.

When all data records are processed and aggregation parameter sets applied, collections of aggregations corresponding to the keys and supplied parameters are produced.

Exemplary Computer

Figure 10:
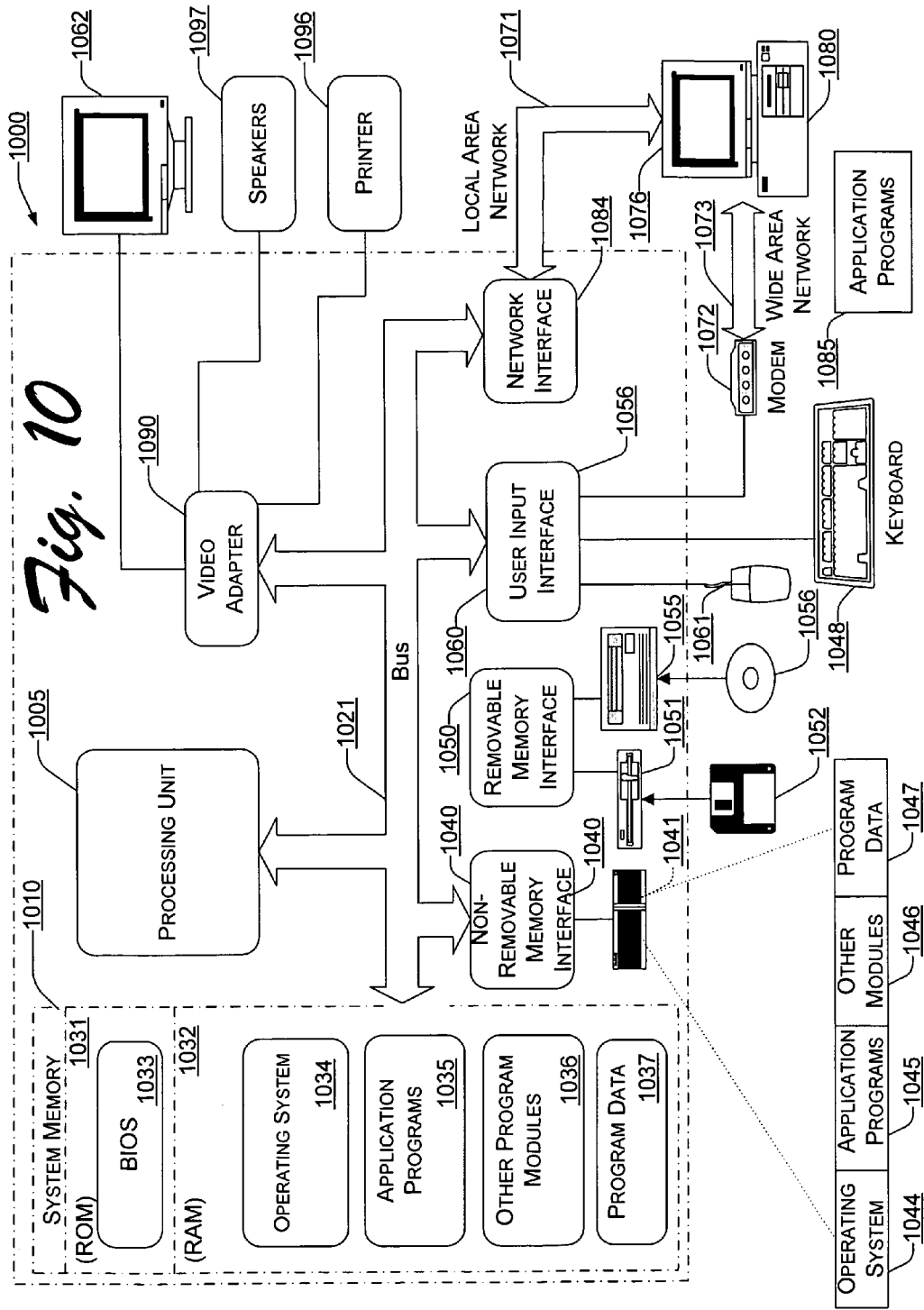
FIG. 10 is a block diagram of a detailed implementation of a computer in which identification and monitoring of virtual servers and nodes of a server cluster may be performed.

FIG. 10 shows an exemplary computing device or computer 1000 suitable as an environment for practicing aspects of the subject matter. In particular, computer 1000 may be a detailed implementation of computer 106 described above. Computer 1000 is suitable as an environment for practicing aspects of the subject matter. The components of computer 1000 may include, but are not limited to processing unit 1005, system memory 1010, and a system bus 1021 that couples various system components including the system memory 1010 to the processing unit 1005. The system bus 1021 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as the Mezzanine bus.

Exemplary computer 1000 typically includes a variety of computer-readable media. Computer-readable media can be any available media that can be accessed by computer 1000 and includes both volatile and nonvolatile media, removable and non-removable media. By way of example, and not limitation, computing device-readable media may comprise computer storage media and communication media. Computer storage media include volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 1000. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection and wireless media such as acoustic, RF, infrared and other wireless media. Combinations of any of the above should also be included within the scope of computing device readable media.

The system memory 1010 includes computing device storage media in the form of volatile and/or nonvolatile memory such as read only memory (ROM) 1031 and random access memory (RAM) 1032. A basic input/output system 1033 (BIOS), containing the basic routines that help to transfer information between elements within computer 1000, such as during start-up, is typically stored in ROM 1031. RAM 1032 typically contains data and/or program modules that are immediately accessible to and/or presently being operated on by processing unit 1005. By way of example, and not limitation, FIG. 10 illustrates operating system 1034, application programs 1035, other program modules 1036, and program data 1037.

The computer 1000 may also include other removable/non-removable, volatile/nonvolatile computer storage media. By way of example only, FIG. 10 illustrates a hard disk drive 1041 that reads from or writes to non-removable, nonvolatile magnetic media, a magnetic disk drive 1051 that reads from or writes to a removable, nonvolatile magnetic disk 1052, and an optical disk drive 1055 that reads from or writes to a removable, nonvolatile optical disk 1056 such as a CD ROM or other optical media. Other removable/non-removable, volatile/nonvolatile computing device storage media that can be used in the exemplary operating environment include, but are not limited to, magnetic tape cassettes, flash memory cards, digital versatile disks, digital video tape, solid state RAM, solid state ROM, and the like. The hard disk drive 1041 is typically connected to the system bus 1021 through a non-removable memory interface such as interface 1040, and magnetic disk drive 1051 and optical disk drive 1055 are typically connected to the system bus 1021 by a removable memory interface such as interface 1050.

The drives and their associated computing device storage media discussed above and illustrated in FIG. 10 provide storage of computer-readable instructions, data structures, program modules, and other data for computer 1000. In FIG. 10, for example, hard disk drive 1041 is illustrated as storing operating system 1044, application programs 1045, other program modules 1046, and program data 1047. Note that these components can either be the same as or different from operating system 1034, application programs 1035, other program modules 1036, and program data 1037. Operating system 1044, application programs 1045, other program modules 1046, and program data 1047 are given different numbers here to illustrate that, at a minimum, they are different copies. A user may enter commands and information into the exemplary computer 1000 through input devices such as a keyboard 1048 and pointing device 1061, commonly referred to as a mouse, trackball, or touch pad. Other input devices (not shown) may include a microphone, joystick, game pad, satellite dish, scanner, or the like. These and other input devices are often connected to the processing unit 1020 through a user input interface 1060 that is coupled to the system bus, but may be connected by other interface and bus structures, such as a parallel port, game port, or in particular a USB port.

A monitor 1062 or other type of display device is also connected to the system bus 1021 via an interface, such as a video interface 1090. In addition to the monitor 1062, computing devices may also include other peripheral output devices such as speakers 1097 and printer 1096, which may be connected through an output peripheral interface 1095.

The exemplary computer 1000 may operate in a networked environment using logical connections to one or more remote computing devices, such as a remote computing device 1080. The remote computing device 1080 may be a personal computing device, a server, a router, a network PC, a peer device or other common network node, and typically includes many or all of the elements described above relative to computer 1000. The logical connections depicted in FIG. 10 include a local area network (LAN) 1071 and a wide area network (WAN) 1073. Such networking environments are commonplace in offices, enterprise-wide computing device networks, intranets, and the Internet.

When used in a LAN networking environment, the exemplary computer 1000 is connected to the LAN 1071 through a network interface or adapter 1070. When used in a WAN networking environment, the exemplary computer 1000 typically includes a modem 1072 or other means for establishing communications over the WAN 1073, such as the Internet. The modem 1072, which may be internal or external, may be connected to the system bus 1021 via the user input interface 1060, or other appropriate mechanism. In a networked environment, program modules depicted relative to the exemplary computer 1000, or portions thereof, may be stored in a remote memory storage device. By way of example, and not limitation, FIG. 10 illustrates remote application programs 1085. It will be appreciated that the network connections shown are exemplary and other means of establishing a communications link between the computing devices may be used.

CONCLUSION

The above-described methods and computers describe collecting and presenting aggregations of received data. Although the invention has been described in language specific to structural features and/or methodological acts, it is to be understood that the invention defined in the appended claims is not necessarily limited to the specific features or acts described. Rather, the specific features and acts are disclosed as exemplary forms of implementing the claimed invention.

What is claimed is:

1. A method of controlling data aggregation implemented on a computing device comprising:
   receiving an individual data record that includes multiple input fields,
   upon receiving the individual data record, selecting a subset of the multiple input fields within the individual data record as a resultant key according to a user defined aggregation parameter set, the user defined aggregation parameter set including:
   (i) a key control previously defined by the user to specify one or more of the multiple input fields as key components within the individual data record; and (ii) an aggregation control previously defined by the user to specify a function or an action to be applied to the specified one or more multiple input fields, the resultant key specified by the user defined aggregation parameter set including:
(i) a concatenation of unmapped, mapped, and composite keys, wherein key values for the unmapped key are unmodified, a mapped key operates to perform a look-up for its corresponding key value, and a new key is created for the composite key by combining other keys with the same composite specification; and
(ii) an identifier of a unique record to which the individual data record contributes data;
computing data aggregations of the multiple input fields according to the resultant key specified by the user defined aggregation parameter set; and
producing collections of aggregations populated as specified by the aggregation parameter set defined by the user, wherein the collections of aggregations are made available to the user.

2. The method of claim 1 wherein the selecting is performed dynamically.

3. The method of claim 1 wherein the computing is based on a record control limit.

4. The method of claim 1 wherein the user defined aggregation parameter set is implemented in a two-dimensional array of Booleans.

5. The method of claim 4 further comprising determining aggregation control subsets by Boolean operations.

6. The method of claim 1 further searching the user defined aggregation parameter set for subsets, marking the subsets, and deferring the marked subsets for processing.

7. The method of claim 6 further comprising computing subsets from the marked subsets.

8. A computer comprising:
a processor;
a memory accessed by and operated on by the processor;
an aggregator framework component accessed by and operated on by the processor, further accessing the memory, configured to receive data records that include multiple input fields and aggregate data in the data records with the multiple input fields using a resultant key in the data records,
wherein the resultant key is a user defined aggregation parameter set, the user defined aggregation parameter set is provided to the aggregation framework component and includes:
(i) a key control previously defined by the user to specify one or more of the multiple input fields as key components within the individual data record; and
(ii) an aggregation control previously defined by the user to specify a function or an action to be applied to the specified one or more multiple input fields; and
the resultant key specified by the user defined aggregation parameter set including (i) a concatenation of unmapped, mapped, and composite keys, wherein key values for the unmapped key are unmodified, a mapped key operates to perform a look-up in a dictionary or other mechanism for its corresponding key value, and a new key is created for the composite key by combining other keys with the same composite specification, and (ii) an identifier of a unique record to which the individual data record contributes data;
computing data aggregations of the multiple input fields according to the resultant key specified by the user defined aggregation parameter set; and
producing collections of aggregations populated as specified by the aggregation parameter set defined by the user, wherein the collections of aggregations are made available to a user.

9. The computer of claim 8 wherein the memory includes aggregators that act on the data records.

10. The computer of claim 8 further comprising a data source that provides the data records.

11. The computer of claim 8 further comprising a data streamer that streams the data records such that the data records are processed individually.

12. The computer of claim 8 further comprising aggregation collections wherein aggregated data is placed.

13. A computer-readable storage media comprising computer-executable instructions that, when executed by a processor, perform acts comprising:
receiving an individual data record that includes multiple input fields comprising key values and data values according to one or more aggregation parameter sets defined by a user, the one or more aggregation parameter sets defined by the user including:
(i) a key control previously defined by the user to specify one or more of the multiple input fields as key components within the individual data record; and
(ii) an aggregation control previously defined by the user to specify a function or an action to be applied to the specified one or more multiple input fields,
the key values being a resultant key including (i) a concatenation of unmapped, mapped, and composite keys, wherein key values for the unmapped key are unmodified, a mapped key operates to perform a look-up for its corresponding key value, and a new key is created for the composite key by combining other keys with the same composite specification, and (ii) an identifier of a unique record to which the individual data record contributes data;
computing data aggregations of the multiple input fields according to the resultant key specified by the user defined aggregation parameter set; and
producing collections of aggregations populated as specified by the aggregation parameter set defined by the user, wherein the collections of aggregations are made available to the user.

14. The computer-readable storage media of claim 13 further comprising:
processing the individual data record through its key values; and
identifying key values of the processed individual data record to a particular aggregation collection which may be made available to the user,
wherein the processing includes applying an aggregation parameter set to the individual data record.

15. The computer-readable storage media of claim 13 further comprising the steps of receiving and processing another data record in a queue of data records.

* * * * *